United States Patent
Waplington

(10) Patent No.: US 11,451,573 B2
(45) Date of Patent: Sep. 20, 2022

(54) MERGING DUPLICATE ITEMS IDENTIFIED BY A VULNERABILITY ANALYSIS

(71) Applicant: ServiceNow, Inc., Santa Clara, CA (US)

(72) Inventor: Brian James Waplington, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 323 days.

(21) Appl. No.: 16/902,996

(22) Filed: Jun. 16, 2020

(65) Prior Publication Data

US 2021/0392155 A1 Dec. 16, 2021

(51) Int. Cl.
*H04L 9/40* (2022.01)
*G06F 16/174* (2019.01)

(52) U.S. Cl.
CPC ...... *H04L 63/1433* (2013.01); *G06F 16/1748* (2019.01)

(58) Field of Classification Search
CPC ............. H04L 63/1433; G06F 16/1748; G06F 16/285; G06F 16/215
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Agarwal et al., "Sentence Boundary Detection Using a MaxEnt Classifier," Proceedings of the 12th Conference of MISC, 2005, pp. 1-6.

(Continued)

*Primary Examiner* — Benjamin M Thieu
(74) *Attorney, Agent, or Firm* — McDonnell Boehnen Hulbert & Berghoff LLP

(57) ABSTRACT

An embodiment may involve a plurality of configuration items and an unmatched configuration item, wherein the unmatched configuration item is associated with a first set of attribute values and a first vulnerability, wherein the first vulnerability is associated with a first set of field values. The embodiment may further involve one or more processors configured to: (i) determine that the unmatched configuration item and a particular configuration item both represent a specific component, wherein the particular configuration item is associated with a second set of attribute values and a second vulnerability, wherein the second vulnerability is associated with a second set of field values; (ii) merge the unmatched configuration item into the particular configuration item; (iii) determine that the first vulnerability and the second vulnerability both represent a specific vulnerability; (iv) merge the first vulnerability into the second vulnerability; and (v) delete the unmatched configuration item and the first vulnerability.

20 Claims, 13 Drawing Sheets

(56) References Cited

U.S. PATENT DOCUMENTS

| | | |
|---|---|---|
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,219,085 B2 | 5/2007 | Buck et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B2 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,749,408 B2 | 8/2017 | Subramani et al. |
| 10,984,666 B1 | 4/2021 | DePaolo et al. |
| 11,228,490 B1 | 1/2022 | Carroll et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0156032 A1* | 7/2006 | Panjwani ............ H04L 63/1433 713/191 |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0082968 A1 | 4/2008 | Chang et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2017/0337749 A1 | 11/2017 | Nerurkar et al. |
| 2018/0122136 A1 | 5/2018 | Lynen et al. |
| 2019/0347423 A1* | 11/2019 | Sanossian ........... H04L 41/0853 |
| 2020/0053116 A1* | 2/2020 | Soroush ................ H04L 43/045 |
| 2020/0202170 A1 | 6/2020 | Basu et al. |
| 2021/0271975 A1 | 9/2021 | Chen et al. |
| 2021/0392154 A1 | 12/2021 | Waplington |

FOREIGN PATENT DOCUMENTS

| | | |
|---|---|---|
| WO | 99/34285 | 7/1999 |
| WO | 00/52559 | 9/2000 |
| WO | 01/79970 | 10/2001 |

OTHER PUBLICATIONS

Ai et al., "Analysis of the Paragraph Vector Model for Information Retrieval," Proceedings of the 2016 ACM International Conference on the Theory of Information Retrieval (ICTIR '16), Sep. 12-16, 2016, Newark, DE, USA, 10 pages.

Dai et al., "Document Embedding with Paragraph Vectors," preprint, Jul. 2015, 8 pages.

"How Does Doc2Vec Represent Feature Vector of a Document?," https://www.quora.com/How-does-doc2vec-represent-feature-vector-of-a-document-Can-anyone-explain-mathematically-how-the-process-is-done (downloaded from public Internet site Sep. 18, 2018), 5 pages.

Le et al., "Distributed Representations of Sentences and Documents," Proceedings of the 31st International Conference on Machine Learning, Beijing, China, 2014, 9 pages, vol. 32.

Mikolov et al., "Distributed Representations of Words and Phrases and their Compositionality," NIPS'13 Proceedings of the 26th International Conference on Neural Information Processing Systems, Dec. 2013, 9 pages.

(56) References Cited

OTHER PUBLICATIONS

Sajjad et al., "Tagging Urdu Text with Parts of Speech: A Tagger Comparison," Proceedings of the 12th Conference of the European Chapterof the ACL, 2009, pp. 692-700.
Servicenow, "Madrid Security Incident Management," last updated May 14, 2019, 315 pages.
Servicenow, "New York IT Service Management," last updated Oct. 17, 2019, downloaded from http://docs.servicenow.com, 267 pages.
Servicenow, "New York Security Incident Management," last updated Oct. 21, 2019, downloaded from http://docs.servicenow.com., 400 pages.
Shperber, Gidi, "A Gentle Introduction to Doc2Vec," https://medium.com/scaleabout/a-gentle-introduction-to-doc2vec-db3e8c0cce5e (downloaded from public Internet site Sep. 18, 2018), 11 pages.
Tensorflow, "Vector Representations of Words," https://www.tensorflow.org/tutorials/word2vec (downloaded from public Internet site Jan. 21, 2018), 12 pages.
Servicenow, Oriando Security Incident Management, https://docs.servicenow.com/bundle/orlando-security-management/page/product/vulnerability-response/reference/vuln-landing-page.html (dated Jan. 23, 2020 on web site).
Notice of Allowance from U.S. Appl. No. 16/897,991, dated Jun. 9, 2022.

* cited by examiner

| UNMATCHED CONFIGURATION ITEM ATTRIBUTE VALUE | DISCOVERED CONFIGURATION ITEM ATTRIBUTE VALUE | SOURCE OF MERGED CONFIGURATION ITEM ATTRIBUTE VALUE |
|---|---|---|
| DEFAULT | DEFAULT | EITHER — 802 |
| DEFAULT | EMPTY | UNMATCHED CONFIGURATION ITEM — 804 |
| DEFAULT | MODIFIED | DISCOVERED CONFIGURATION ITEM — 806 |
| EMPTY | DEFAULT | DISCOVERED CONFIGURATION ITEM — 808 |
| EMPTY | EMPTY | EITHER — 810 |
| EMPTY | MODIFIED | DISCOVERED CONFIGURATION ITEM — 812 |
| MODIFIED | DEFAULT | UNMATCHED CONFIGURATION ITEM — 814 |
| MODIFIED | EMPTY | UNMATCHED CONFIGURATION ITEM — 816 |
| MODIFIED | MODIFIED | DISCOVERED CONFIGURATION ITEM — 818 |

FIG. 8

| Field Name | Merge Rule | Type | Field Name | Merge Rule | Type |
|---|---|---|---|---|---|
| active | computed | tinyint(1) | managed_by_vul | max | tinyint(1) |
| age_closed | difference between closed_at and age_closed | int(11) | netbios | oldest | varchar(40) |
| age_duration | computed | datetime | number | oldest | varchar(40) |
| assigned_to | newest | varchar(32) | opened_at | newest | datetime |
| assignment_group | newest | varchar(32) | opened_by | newest | varchar(32) |
| assignment_rule | newest | varchar(32) | port | oldest | int(11) |
| assignment_type | newest | int(11) | preferred_solution | newest | varchar(32) |
| backup_state | newest | int(11) | priority | newest | int(11) |
| business_criticality | newest | varchar(40) | protocol | oldest | varchar(40) |
| change_approval | newest | varchar(32) | qualys_assignee_email | oldest | varchar(100) |
| close_notes | newest | mediumtext | qualys_assignee_name | oldest | varchar(100) |
| closed_at | newest | datetime | qualys_severity | oldest | int(11) |
| closed_by | newest | varchar(32) | qualys_ticket | oldest | varchar(40) |
| cmdb_ci | same for all duplicates | varchar(32) | qualys_ticket_state | oldest | varchar(40) |
| comments | concatenate | mediumtext | r7_proof | oldest | mediumtext |
| description | newest | mediumtext | reopened | max | tinyint(1) |
| dns | oldest | varchar(100) | resolution_date | max | date |
| external_id | oldest | varchar(128) | resolution_reason | newest | mediumtext |
| first_found | min | date | resolved_by | newest | varchar(32) |
| has_impacted_services | newest | varchar(40) | risk_rating | min in choice list order | int(11) |
| ignore_date | max | datetime | risk_score | max | int(11) |
| ignore_expiration | max | date | security_tags | concatenate | mediumtext |
| ignore_reason | newest | mediumtext | short_description | newest | varchar(160) |
| ignored_by | newest | varchar(32) | source | newest | varchar(40) |
| installation | newest | varchar(32) | src_ci | oldest | varchar(32) |
| integration | oldest | varchar(32) | ssl | max | tinyint(1) |
| integration_instance | oldest | varchar(32) | state_inheritance_count | max | int(11) |
| integration_run | oldest | varchar(32) | status | oldest | varchar(40) |
| ip_address | oldest | varchar(40) | sw_vulnerability | newest | varchar(32) |
| is_in_group | max | tinyint(1) | times_found | max | int(11) |
| last_found | max | date | ttr_applied_rule | newest | varchar(32) |
| last_opened | max | date | ttr_calculated | max | tinyint(1) |
| last_updated_by_source | max | datetime | ttr_status | max in choice list order | varchar(40) |
| | | | ttr_target_date | min | datetime |
| | | | vulnerability | same for all duplicates | varchar(32) |
| | | | work_notes | Concatenate | mediumtext |

FIG. 9

| State Vulnerability 1 | State Vulnerability 2 | State Vulnerability 3 | Field Vulnerability 1 | Field Vulnerability 2 | Field Vulnerability 3 |
|---|---|---|---|---|---|
| Under Investigation | Open | | | Under Investigation | Under Investigation |
| Awaiting Implementation | Open | | | Awaiting Implementation | Awaiting Implementation |
| Resolved | Open | | | resolution_date | opened_at |
| Deferred | Open | | | ignore_date | opened_at |
| Closed | Open | | | closed_at | opened_at |
| In Review | Open | | | In Review | In Review |
| Awaiting Implementation | Under Investigation | | | sys_updated_on | sys_updated_on |
| Resolved | Under Investigation | | | resolution_date | sys_updated_on |
| Deferred | Under Investigation | | | ignore_date | sys_updated_on |
| Closed | Under Investigation | | | closed_at | sys_updated_on |
| In Review | Under Investigation | | | sys_updated_on | sys_updated_on |
| Resolved | Awaiting Implementation | | | resolution_date | sys_updated_on |
| Deferred | Awaiting Implementation | | | ignore_date | sys_updated_on |
| Closed | Awaiting Implementation | | | closed_at | sys_updated_on |
| In Review | Awaiting Implementation | | | sys_updated_on | sys_updated_on |
| Deferred | Resolved | | | ignore_date | resolution_date |
| Closed | Resolved | | | closed_at | resolution_date |
| In Review | Resolved | | | sys_updated_on | resolution_date |
| Closed | Deferred | | | closed_at | ignore_date |
| In Review | Deferred | | | sys_updated_on | ignore_date |
| In Review | Closed | | | sys_updated_on | closed_at |

FIG. 10

MERGING DUPLICATE ITEMS IDENTIFIED BY A VULNERABILITY ANALYSIS

BACKGROUND

A remote network management platform may be used to discover or otherwise identify configuration items in a managed network. These configuration items may represent hardware components, software components executable thereon, services provided by one or more of these components, and/or other information. Discovered configuration items may be stored as entries in a configuration management database (CMDB). For sake of simplicity, a "discovered" configuration item herein may be a configuration item that was provided to the CMDB by discovery processes, hardware or software asset management processes, a purchase management process, or manually, for example.

Additionally, vulnerability detection tools may perform vulnerability analyses on the managed network. Such tools may scan the hardware and/or software components to identify vulnerabilities. These vulnerabilities may be defects in hardware, operating systems, and/or software packages that can be exploited to gain unauthorized access to certain information on the managed network or to cause one or more components of the managed network to behave in an undesirable fashion. Vulnerability detection tools may store their findings as vulnerable items, which identify combinations of vulnerabilities and the configuration items on which these vulnerabilities were found. A vulnerability may be specified by values of a number of fields associated therewith.

Due to differences in how the remote network management platform performs discovery and how vulnerability detection tools identify configuration items, vulnerability detection tools may represent configuration items differently than how they are represented by discovery applications or other applications. For example, configuration items generated by vulnerability detection tools may have different attribute values than those generated by discovery applications.

This can lead to a number of problems, including multiple configuration items in the CMDB characterized as being different when they actually represent the same component. This can be confusing and can cause unnecessary delays when resolving the identified vulnerabilities. Further, the CMDB can become cluttered with duplicate configuration items, wasting memory with redundant information.

SUMMARY

The embodiments herein overcome these and other problems by providing rule-based techniques for merging duplicate configuration items and duplicate vulnerabilities. Such techniques may involve three related but separable steps.

First, duplicate configuration items are identified in the CMDB. This may involve determining that an unmatched configuration item found by a vulnerability detection tool matches a discovered configuration item. Various matching algorithms may be used, from displaying similar configuration items and having users manually specifying matches to machine learning techniques that automatically or semi-automatically identify matches. The exact procedure used for this step is beyond the scope of this document.

Second, duplicate configuration items identified by the first step may be merged. This can involve copying values of attributes from the unmatched configuration item found by the vulnerability detection tool into the discovered configuration item. During this process, preference may be given to any non-default or non-empty values already populated in the attributes of the discovered configuration item. Further, any vulnerabilities that refer to the unmatched configuration item are made to refer to the discovered configuration item. Then, the unmatched configuration item can be deleted.

Third, the vulnerabilities referring the discovered configuration item (which now incorporates information merged from the unmatched configuration item) are considered. Any two vulnerabilities referring to this configuration item and representing the same vulnerability may be merged. These vulnerabilities may be defined by a set of fields with associated values. Thus, the merging process may apply different rules per field type (e.g., system-defined, user-defined, or application-defined) and/or on a per-field basis.

While the above discussion focuses on merging a pair of configuration items and then a pair of vulnerabilities, multiple configuration items and vulnerabilities can be merged. Any number of configuration items may be merged by applying pair-wise merging to a first two configuration items to form a merged configuration item, then applying pair-wise merging to a third configuration item and the merged configuration item, and so on. Likewise, any number of vulnerabilities per configuration item may be merged by applying pair-wise merging to a first two vulnerabilities to form a merged vulnerability, then applying pair-wise merging to a third vulnerability and the merged vulnerability, and so on.

Accordingly, a first example embodiment may involve persistent storage containing a plurality of configuration items and an unmatched configuration item, wherein the unmatched configuration item is associated with a first set of attribute values and a first vulnerability, and wherein the first vulnerability is associated with a first set of field values. The first example embodiment may further involve one or more processors configured to: (i) determine that the unmatched configuration item and a particular configuration item from the plurality of configuration items both represent a specific component of a managed network, wherein the particular configuration item is associated with a second set of attribute values and a second vulnerability, and wherein the second vulnerability is associated with a second set of field values; (ii) merge the unmatched configuration item into the particular configuration item, wherein preference is given to modified values of the second set of attribute values over corresponding values of the first set of attribute values; (iii) determine that the first vulnerability and the second vulnerability both represent a specific vulnerability of the specific component; (iv) merge the first vulnerability into the second vulnerability based on rules that consider content and types of the first set of field values and the second set of field values; and (v) delete the unmatched configuration item and the first vulnerability from the persistent storage.

A second example embodiment may involve determining that an unmatched configuration item and a particular configuration item both represent a specific component of a managed network, wherein the unmatched configuration item is associated with a first set of attribute values and a first vulnerability, wherein the first vulnerability is associated with a first set of field values, wherein the particular configuration item is associated with a second set of attribute values and a second vulnerability, and wherein the second vulnerability is associated with a second set of field values. The second example embodiment may further involve merging the unmatched configuration item into the particular configuration item, wherein preference is given to modified values of the second set of attribute values over corresponding values of the first set of attribute values. The second example embodiment may further involve determining that the first vulnerability and the second vulnerability both represent a specific vulnerability of the specific component. The second example embodiment may further involve merging the first vulnerability into the second vulnerability based on rules that consider content and types of the first set of field values and the second set of field values. The second example embodiment may further involve deleting the unmatched configuration item and the first vulnerability.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 is a set of rules for merging duplicate configuration items, in accordance with example embodiments.

FIG. 9 depicts a table of rules for merging vulnerability fields, in accordance with example embodiments.

FIG. 10 depicts a table of rules for merging a state field, in accordance with example embodiments.

DETAILED DESCRIPTION

Figure 1:
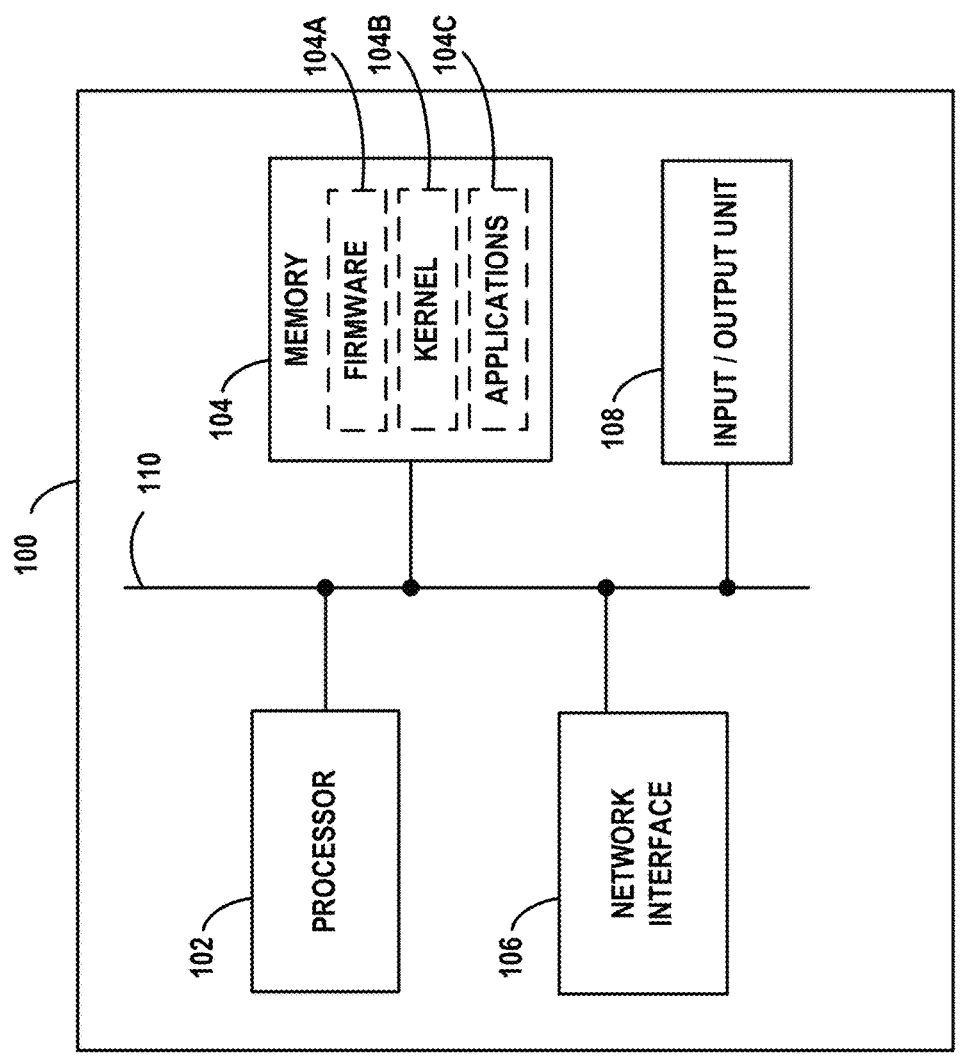
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
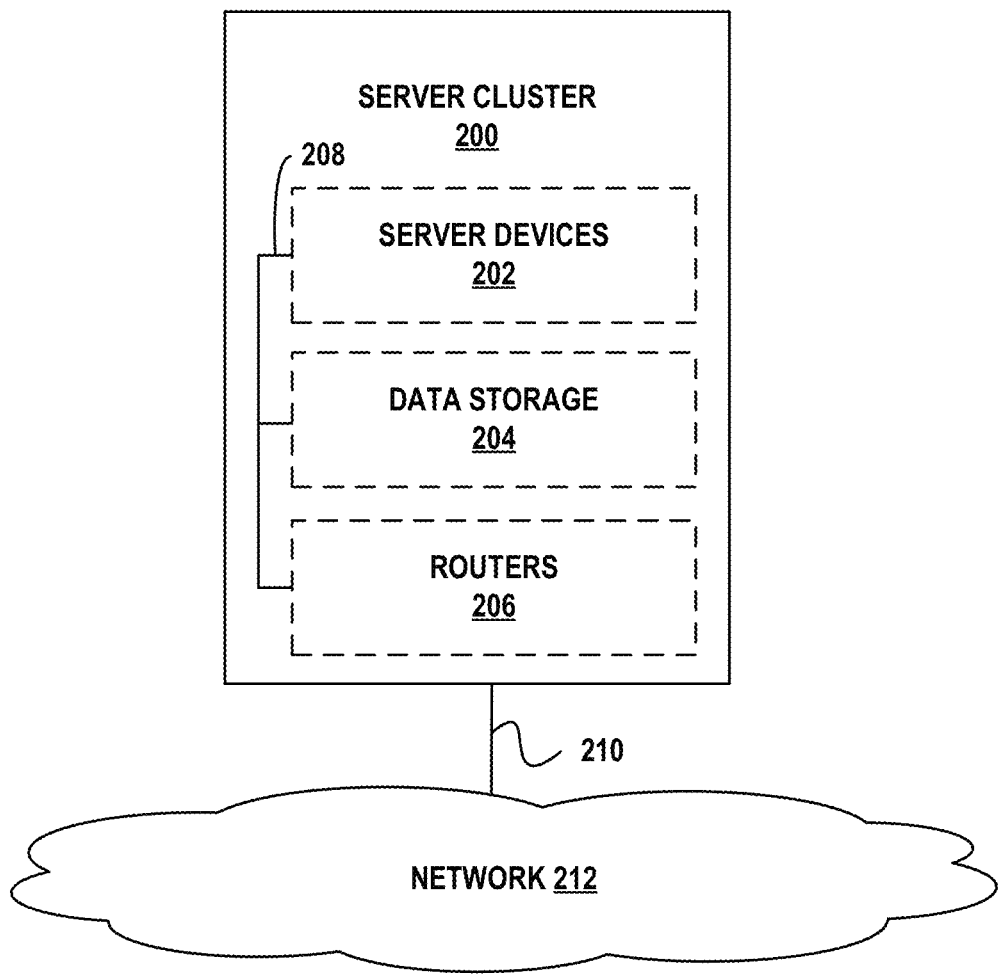
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
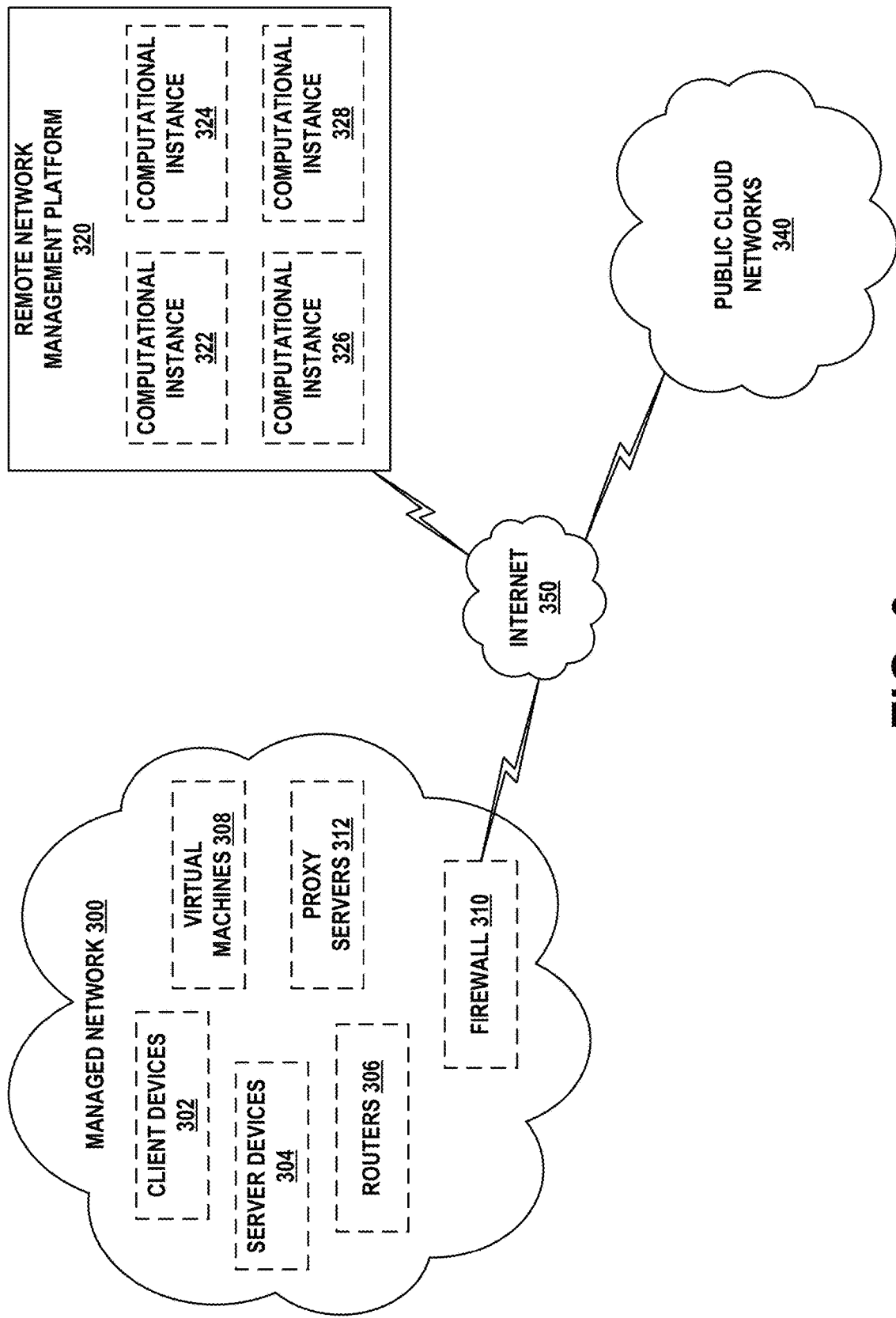
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
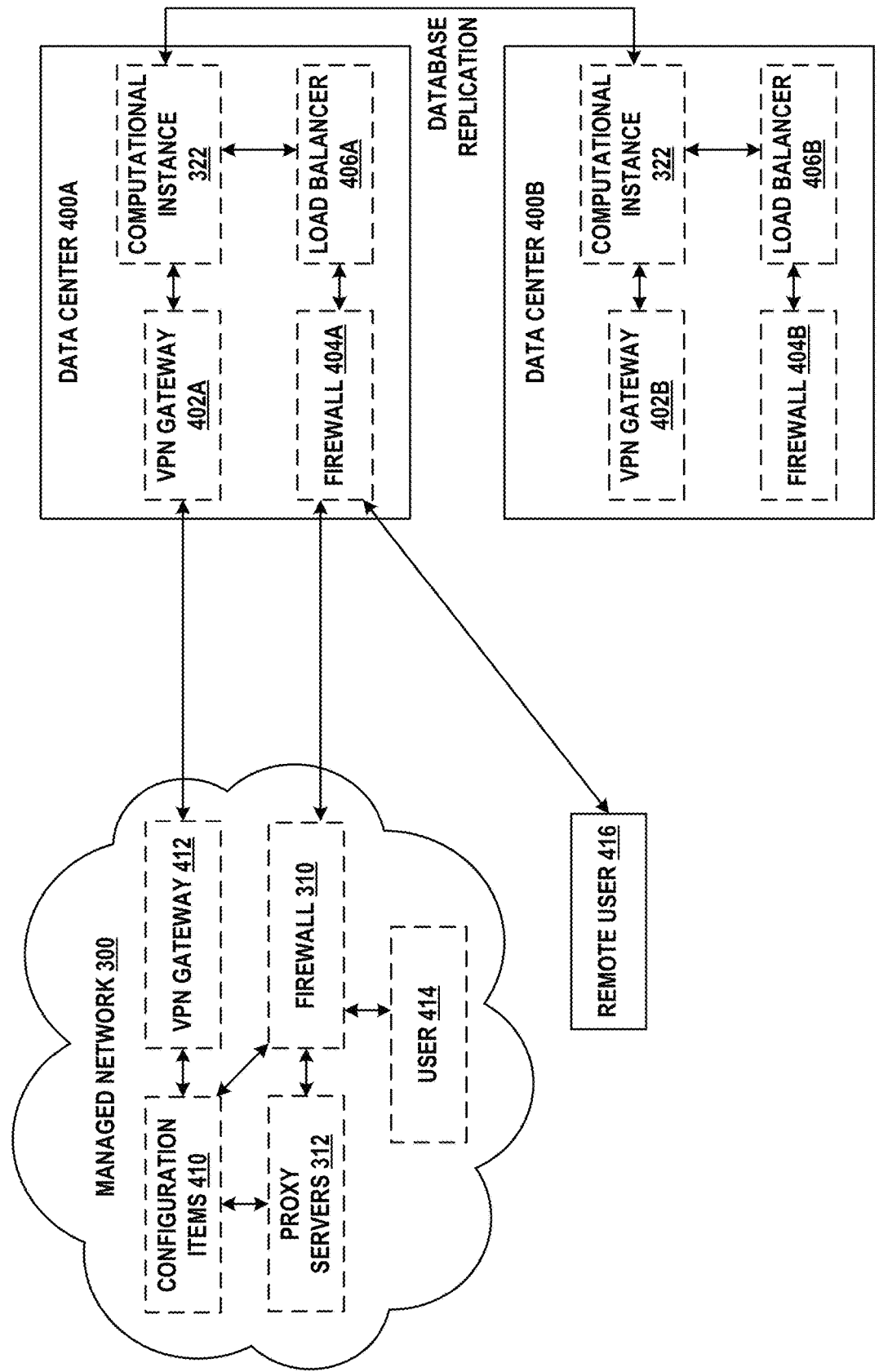
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
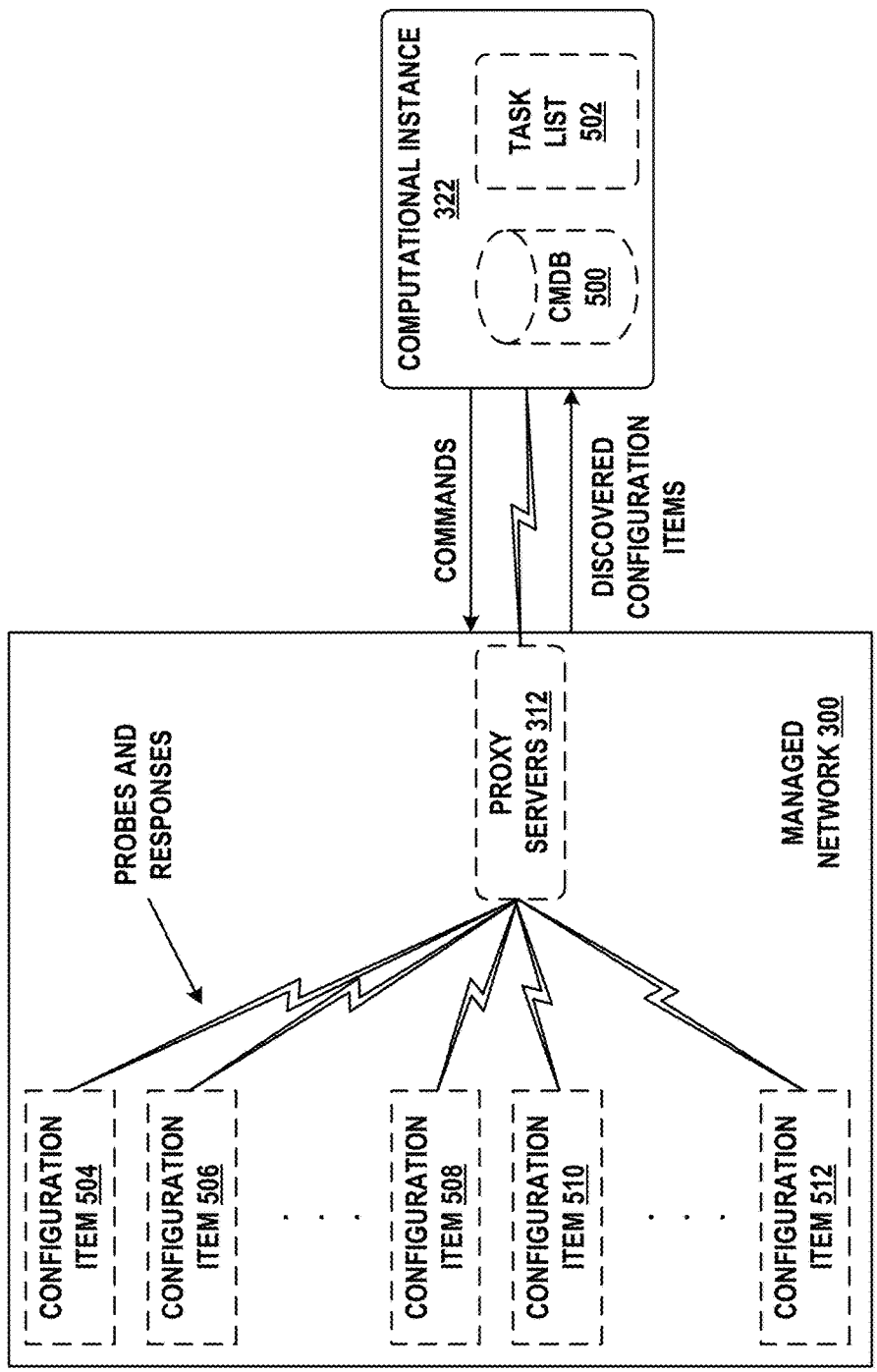
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
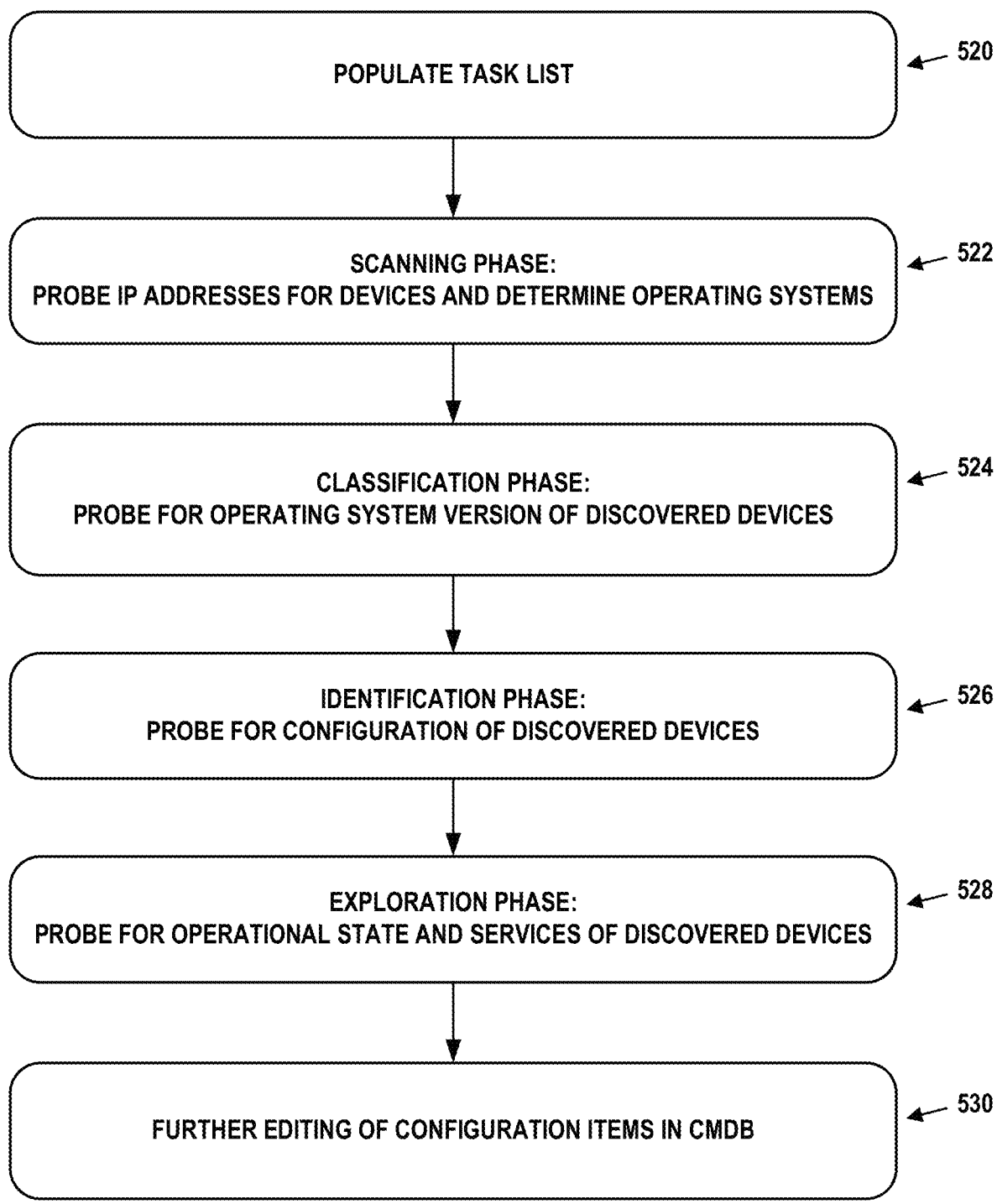
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Cmdb Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Vulnerabilities

The vulnerabilities discussed herein may relate to known defects in hardware, operating systems, and/or software packages deployed throughout a managed network. Exploitation of a vulnerability may result in a negative impact to the data confidentiality, integrity, and/or availability of one or more computing devices. Such vulnerabilities may be associated with different severities.

For example, a first hypothetical vulnerability may be that opening a certain type of file in a word processing application provides a remotely-exploitable mechanism through which an attacker can gain access to the computing device on which the word processing application is installed. This would likely be viewed a critical vulnerability, as it could lead to unauthorized access to confidential data. On the other hand, a second hypothetical vulnerability may be that providing certain input to a web browsing application may cause the screen of the computing device on which the web browsing application is installed to go blank. This would likely be viewed as a non-critical vulnerability, as it is a mere annoyance to the user. Severity may be chosen, for example, on a spectrum from critical (most severe), to high, to medium, to low (least severe).

Listings of known vulnerabilities are published by governments, as well as various commercial entities. For example, the U.S. National Institute of Standards and Technology (NIST) maintains a public national vulnerability database, listing known vulnerabilities, their severities, and their exploitability (e.g., how an attacker might go about using the vulnerability and how hard this process might be). Exploitability scales may include indications of whether a known exploit exists, how skilled an attacker would have to be to use the exploit, whether the attacker needs physical access to a target computing device to use the exploit, and/or if the exploit can be used by way of a local or remote network.

Commercial listings may overlap with the government listings and with one another, but can include different vulnerability listings, and use different severity scales and/or exploitability scales. These discrepancies may be due to inherent subjectivity related to classifying vulnerability severity and exploitability, or that these commercial and governmental entities have had different experiences when testing the vulnerability.

Each vulnerability may be associated with a number of fields, and each field may take on a value. Examples of possible field of a vulnerability include whether it is active, to whom it is assigned, its severity, a reference to a configuration item on which it was detected, the IP address of a device on which it was detected, the DNS address of a device on which it was detected, when it was detected (opened), a short description of the vulnerability, a status of the vulnerability, and so on. A more complete list of these fields is provided in FIG. 9.

It should be noted that vulnerabilities are not the same as active security threats. Vulnerabilities indicate that a problem has been identified independent of whether the vulnerability has been actually exploited. Active security threats, on the other hand, are ongoing exploitations that often require immediate attention. For example, a live distributed denial of service (DDOS) attack should be addressed in real time, regardless of whether any vulnerabilities that it uses are known.

Thus, security managers address vulnerabilities as time allows based on their severities and other factors. Critical severity vulnerabilities may be targeted for resolution within 3 days, for example, while high severity vulnerabilities may be targeted for resolution within 30 days, and so on. Vulnerabilities with lower-level severities may be addressed on an as-time-permits basis or might not be scheduled for resolution at all, as these non-critical vulnerabilities may be deemed low enough risk that security managers should be spending their time carrying out more important tasks instead.

Addressing a vulnerability may occur in various ways. In some cases, the vendor of an operating system or software package with an identified vulnerability may publish an installable patch that resolves the vulnerability. Alternatively, the vendor or another party may identify a workaround to the vulnerability, such as settings that mitigate or prevent the vulnerability from occurring. In some cases, security managers may disable software packages with unpatched vulnerabilities or issue warnings to users until a patch or workaround is available. In extreme situations, vulnerable software may be temporarily or permanently removed from impacted computing devices. Nonetheless, once a resolution is available, security managers may schedule the resolution to be applied in accordance with the severity of the vulnerability.

As the scope of computer networks and the extent of available software packages have grown dramatically, so has the number of vulnerabilities. For instance, the NIST database identified 1537 new vulnerabilities in April 2019 alone. This is in addition to other vulnerabilities that may have been identified in the past. As a result, there are over 117,000 known vulnerabilities in the NIST database. Identifying these vulnerabilities and their associated severities is not possible to do by hand even for a small managed network with just a few devices.

VII. Vulnerability Management Architecture

In order to be addressed, vulnerabilities are first detected on a managed network. Given the intractability of doing so manually, a number of software tools are available that perform automated vulnerability detection. Some of these tools include, but are not limited to, NESSUS®, QUALYSGUARD®, and RAPID7®. For purposes of simplicity, various vulnerability detection and assessment tools are referred to as third-party vulnerability detection tools or vulnerability scanners in the discussion below.

Figure 6:
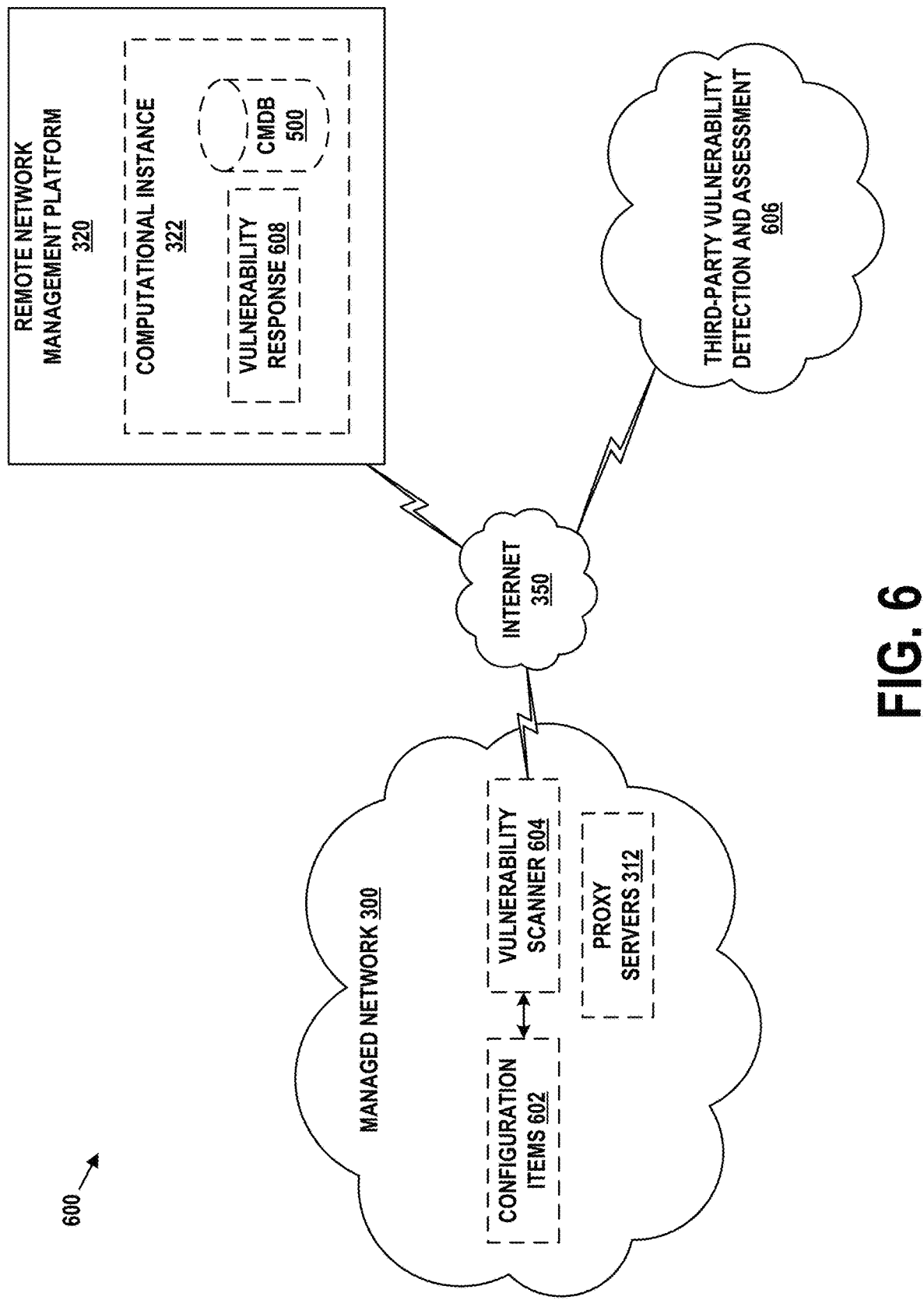
FIG. 6 depicts a vulnerability management architecture, in accordance with example embodiments.

FIG. 6 depicts a vulnerability management architecture 600. Architecture 600 includes managed network 300, remote network management platform 320, and third-party vulnerability detection and assessment cloud 606 (referred to as cloud 606 for short), all connected by Internet 350.

Managed network 300 is largely the same as shown in FIG. 3, but just showing configuration items 602, vulnerability scanner 604, and proxy server(s) 312. Each of configuration items 602 may represent a virtual or physical computing device, a software application installed upon such a computing device, or a service provided by one or more computing devices. Vulnerability scanner 604 may be a dedicated unit of software and/or a virtual or physical computing device that is deployed within managed network 300 to detect vulnerabilities relating to configuration items 602. Thus, vulnerability scanner 604 may be referred to as a vulnerability detection tool. Proxy server(s) 312 may take on the same or similar functionality as described above.

In some embodiments, vulnerability scanner 604 may include a software agent that is deployed on multiple endpoints, where each endpoint is represented as one or more of configuration items 602. In these or other embodiments, vulnerability scanner 604 may include one or more software applications deployed on one or more dedicated computing devices. In either situation, vulnerability scanner 604 may scan or otherwise remotely access configuration items 602 to detect vulnerabilities. For example, vulnerability scanner 604 may scan configuration items 602—e.g., probe for open TCP/IP ports on computing devices, and/or log on to computing devices to determine the operating system, software applications installed thereon, and versions thereof. In some embodiments, vulnerability scanner 604 may store the results of these scans locally, may transmit the results to cloud 606, and/or may transmit the results to computational instance 322 for processing by vulnerability response module 608 and/or storage in CMDB 500, for example. Vulnerability scanner 604 may represent its results in various ways, such as an identification or description of the vulnerability, as well as some information about the hardware or software component on which the vulnerability has been found. These representations may include the vulnerability fields mentioned above and described below in more detail.

Remote network management platform 320 is the same or similar to that of FIG. 3, but showing only one computational instance, computational instance 322, for sake of simplicity. Computational instance 322 includes vulnerability response module 608 and CMDB 500. Vulnerability response module 608 may be an application configured to integrate vulnerabilities found by vulnerability scanner 604 into CMDB 500. As described above, CMDB 500 may include representations of configuration items 602, including multiple attributes for each.

Cloud 606 is an optional component that might not be present when vulnerability scanner 604 stores the results of scans locally. However, when present, cloud 606 receives these results, and cloud 606 may store and assess the results. For instance, cloud 606 may identify vulnerabilities based on the operating system and version thereof, operating system configuration, software application and version thereof, software configuration, and possibly other metrics as well. The identified vulnerabilities may be stored and then made available by way of an interface, such as a web-based graphical user interface, a JavaScript Object Notation (JSON) interface, an XML interface, or some other form of interface.

In particular, vulnerability response module 608 may be configured to obtain the results of a vulnerability scan from cloud 606, or from vulnerability scanner 604 by way of proxy server(s) 312. Vulnerability response module 608 may then use information that identifies the configuration item on which the vulnerability was found to look up the configuration item in CMDB 500. As part of this lookup process, the identification rules and reconciliation techniques described above may be used.

If the lookup results in a match, the vulnerability may be associated with the discovered configuration item in CMDB 500. If the lookup does not result in a match, then vulnerability response module 608 may create a new, unmatched configuration item in CMDB 500 based on this identifying information. Vulnerability response module 608 may then associate the vulnerability with this unmatched configuration item. An unmatched configuration item may be similar to other configuration items except that it contains an attribute value indicating that it is unmatched.

Figure 7A:
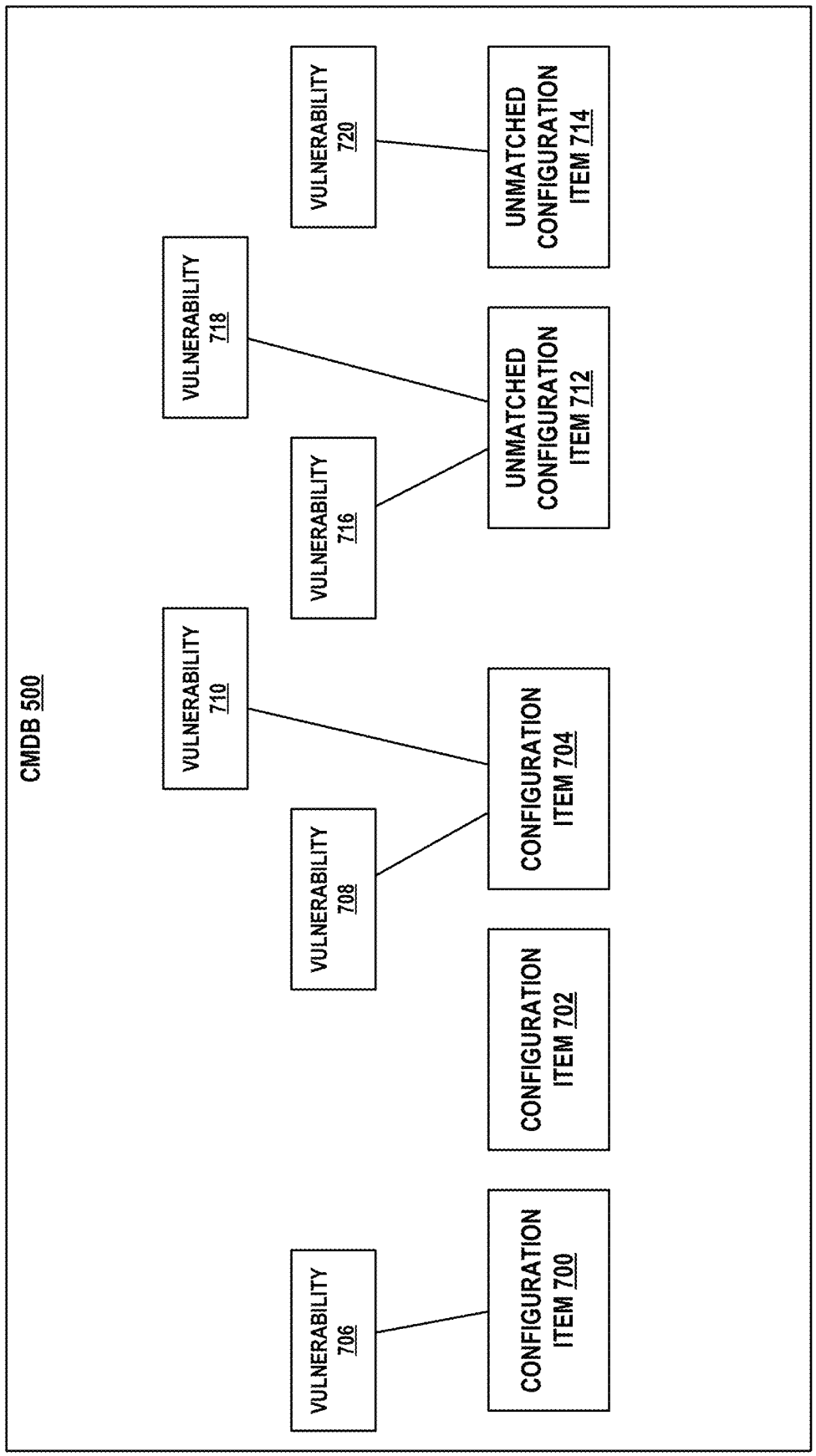
FIG. 7A depicts an arrangement of configuration items, in accordance with example embodiments.

As a consequence of this processing, some of the content of CMDB 500 may resemble the arrangement of FIG. 7A. In particular, FIG. 7A provides examples of configuration items stored in CMDB 500. Relationships between these configuration items are not shown for purposes of simplicity.

Configuration items 700, 702, and 704 are assumed to have been generated in response to discovery processes executed by computational instance 322, and therefore may be referred to as "discovered" configuration items. As noted above, a discovered configuration item herein may be a configuration item that was provided to CMDB 500 by discovery processes, hardware or software asset management processes, purchase management process, or manually, for example. Configuration items 712 and 714 are assumed to be unmatched configuration items generated in response to operations of vulnerability scanner 604.

Configuration item 700 is associated with vulnerability 706. This association may have been made due to vulnerability scanner 604 detecting vulnerability 706 on configuration item 700, and providing this information to CMDB 500 by way of vulnerability response module 608.

Configuration item 702 is not associated with any vulnerabilities. Thus, this configuration item is shown as not connected to a vulnerability.

Configuration item 704 is associated with vulnerabilities 708 and 710. Like configuration item 700, these associations may have been made due to vulnerability scanner 604 detecting vulnerabilities 708 and 710 on configuration item 704, and providing this information CMDB 500 by way of vulnerability response module 608.

Unmatched configuration item 712 is associated with vulnerabilities 716 and 718. These associations may have been made due to vulnerability scanner 604 detecting vulnerabilities 716 and 718 on configuration item 712, and providing this information CMDB 500 by way of vulnerability response module 608. However, vulnerability response module 608 was unable to match configuration item 712 with any existing configuration item (e.g., configuration items 700, 702, and 704). Thus, vulnerability response module 608 created configuration item 712 as an unmatched configuration item.

Unmatched configuration item 714 is associated with vulnerability 720. Like unmatched configuration item 712, this association may have been made due to vulnerability scanner 604 detecting vulnerability 720 on configuration item 714, and providing this information CMDB 500 by way of vulnerability response module 608. However, vulnerability response module 608 was unable to match configuration item 714 with any existing configuration item (e.g., configuration items 700, 702, and 704). Thus, vulnerability response module 608 created configuration item 714 as an unmatched configuration item.

Figure 7B:
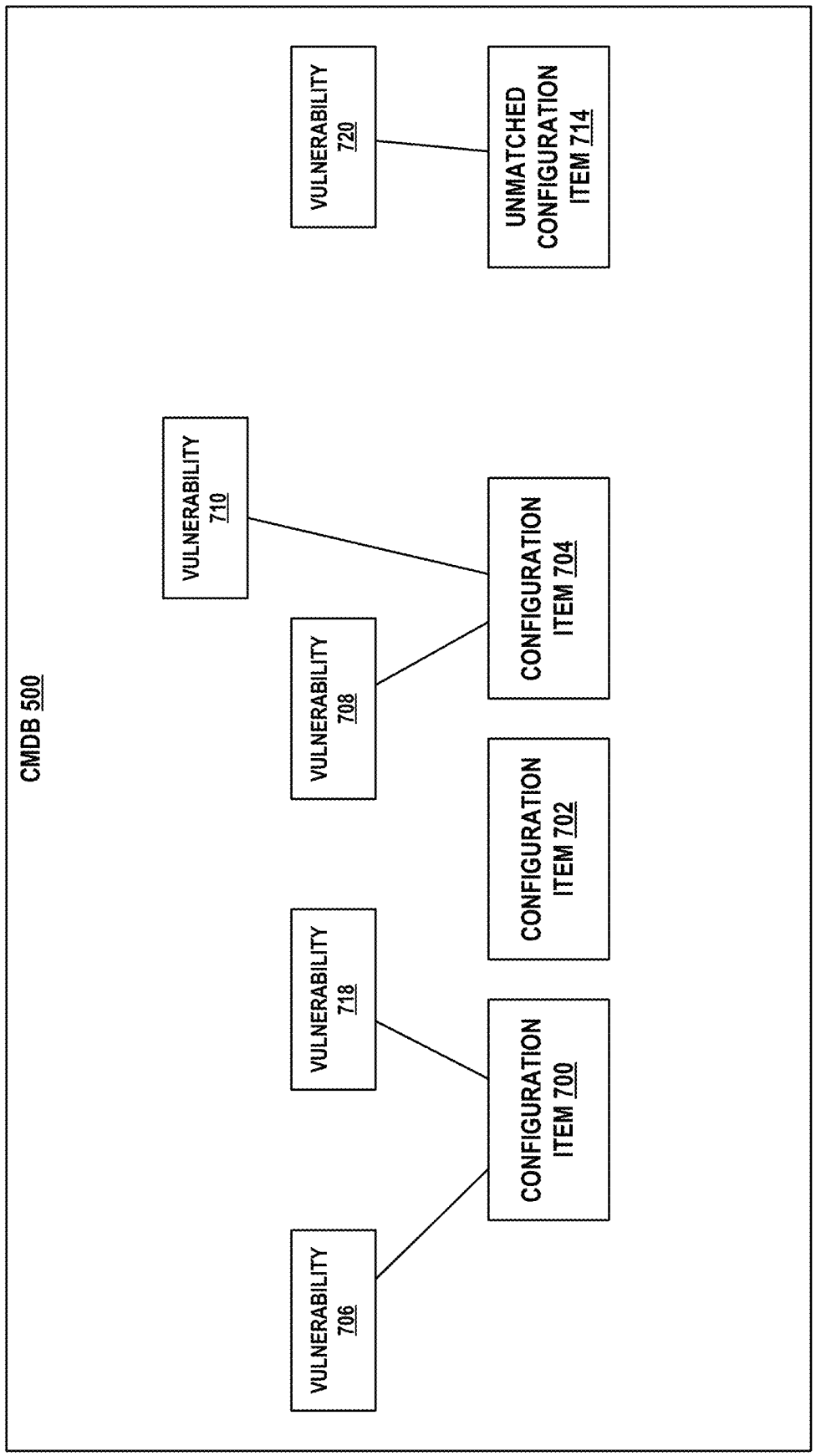
FIG. 7B depicts the arrangement of configuration items from FIG. 7A after merge operations, in accordance with example embodiments.

The arrangement of FIG. 7B shows the result of merge procedures on the configuration items of FIG. 7A. In particular, configuration item 712 was merged with configuration item 700. By convention, when an unmatched configuration item is merged with a configuration item generated by discovery procedures, the name of the latter is preserved. Thus, the merged configuration item is denoted configuration item 700, and the merge process can be considered to involve copying at least some information from unmatched configuration item 712 to configuration item 700.

To that point, the merging of these two configuration items may involve combining the attribute values of unmatched configuration item 712 with those of configuration item 700 according to a set of rules. These rules may vary from attribute to attribute, and examples of such rules are provided below.

After the initial merging of configuration item 712 and configuration item 700, vulnerabilities 706, 716, and 718 are all associated with configuration item 700. But vulnerability 716 was determined to be the same as vulnerability 706. As a consequence, these two vulnerabilities were merged—particularly, vulnerability 716 was merged into vulnerability 706. This may involve combining the field values of vulnerability 716 with those of vulnerability 706 according to a set of rules. These rules may vary from field to field, and examples of such rules are provided below.

After the merge is complete, any memory used to store unmatched configuration item 712 and vulnerability 716 may be freed, as the relevant information for both has been incorporated into configuration item 700 and vulnerability 706, respectively. Freeing this memory eliminates redundancy and increases the efficiency of CMDB 500.

An example of why the merging illustrated by FIGS. 7A and 7B might take place follows. For sake of argument, assume that configuration items 700 and 712 both represent the same hardware component, e.g., a computing device in a managed network. When discovery was last executed, the computing device had an IP address of 192.168.0.10. But after this discovery completed and before vulnerability scanner 604 performed an updated scan on the computing device, its IP address was administratively changed to 10.1.2.3. When vulnerability response module 608 initially attempted to match configuration item 712 to another configuration item in CMDB 500, it was unable to do so because of this discrepancy between IP addresses. Therefore, vulnerability response module 608 generated unmatched configuration item 712 as a placeholder, and associated detected vulnerabilities 716 and 718 with this unmatched configuration item.

Nonetheless, in this scenario, the DNS name, NetBIOS name, and hardware serial number of the computing device has not changed. Therefore, when vulnerability response module 608 (or another software module) later attempts to match unmatched configuration items, it may be able to do so by observing that the commonalities between the attributes of configuration items 700 and 712 (DNS name, NetBIOS name, and hardware serial number) far outweigh the difference (IP address). Thus, vulnerability response module 608 may determine that configuration items 700 and 712 represent the same computing device, and may merge these configuration items.

As noted above, once this configuration item merge takes place, a further merge procedure may be performed on the vulnerabilities of the merged configuration item. In this scenario, vulnerabilities 706 and 716 may both indicate that the computing device is configured with an unpatched version of an operating system that has a known exploit, whereas vulnerability 718 may indicate that the computing device is configured with a weak administrative password (e.g., less than 8 characters). In particular, vulnerabilities 706 and 716 may share numerous field values in common, while vulnerability 718 has field values that are largely distinct from those of vulnerabilities 706 and 716. Thus, vulnerability 716 may be merged into vulnerability 706, while vulnerability 718 may be associated as is (or mostly as is) with the merged configuration item.

A goal of a CMDB (such as CMDB 500) is to be a source of truth regarding the configuration of a managed network. As large managed networks can have hundreds of thousands or even millions of configuration items, this goal becomes even more important to achieve. Whenever there are duplicate configuration items in the CMDB, such as unmatched configuration items that could be merged into discovered configuration items, the CMDB becomes more difficult to use and less trustworthy.

Further, duplicate configuration items and vulnerabilities unnecessarily use CMDB storage capacity that could be conserved or put to other uses. Also, as the CMDB grows, its performance may slow down accordingly. Therefore, it is desirable to be able to merge unmatched configuration items and their associated vulnerabilities into discovered configuration items as discussed above. After doing so, redundant configuration items can be removed from the CMDB, thereby improving CMDB accuracy and performance.

VIII. Example Merge Procedures

This section describes example configuration item and vulnerability merge procedures in detail. In particular, these procedures generally adhere to three steps: (i) identifying unmatched configuration items to merge into discovered configuration items, (ii) merging a specific unmatched configuration item into a specific discovered configuration item based on their respective attribute values, and (iii) for a merged configuration item, further merging any duplicating vulnerabilities associated therewith based on their respective field values.

In the procedures below, it is assumed that one unmatched configuration item is being processed at a time. Thus, even if two (or more) unmatched configuration items represent the same component in managed network, they each may be separately merged with a discovered configuration item, e.g., the first unmatched configuration item is merged with a discovered configuration item then the second unmatched configuration item is merged with the same discovered configuration item. In this way, merges may occur in a serialized, pairwise fashion.

Notably, these procedures may take place at any time after the unmatched configuration item is stored in the CMDB. Thus, these procedures may be configured to execute once per day or once per week, for example, or may be manually triggered to execute.

A. Identifying Duplicate Configuration Items

An application, such as vulnerability response module 608, may be configured to compare unmatched configuration items with discovered configuration items to identify duplicate configuration items that can be merged. The exact procedure used for this step is beyond the scope of this document, but example embodiments are nonetheless described.

It is possible for duplicate configuration items to be manually identified, e.g., by a user. For example, computational instance 322 may display lists of configuration items in the CMDB on a web-based interface. The user may determine, based on his or her own personal knowledge and experience, that certain pairs of these configuration items can be merged. Then, the user may manually perform the merge. But with large CMDBs (e.g., with tens of thousands of configuration items) such manual identification is error-prone and subjective, with different users potentially performing the identification and subsequent merges in different ways.

A more objective way to identify duplicate configuration items is through use of a software application that considers embeddings of the respective attribute values of configuration items. Thus, this application may include embedding model, vector comparator, and vector matcher sub-modules.

The embedding model may be a machine learning model, such an artificial neural network, configured to generate an embedding vector based on one or more attribute values provided thereto as input. Thus, the embedding model may be configured to generate candidate embedding vectors based on attribute values of discovered configuration items in CMDB 500. These embedding vectors may be referred to as candidate embedding vectors because each is a potential match for an embedding vector generated based on attributes of the unmatched configuration item.

In some implementations, some or all of the attribute values may be represented as character strings. Thus, the embedding model may be a character string embedding model configured to generate embedding vectors based on the character strings. For example, embedding model may include, utilize, and/or implement aspects of Word2Vec, GloVe, fastText, Gensim, or other word embedding architectures. In other implementations, some or all of the attribute values may be represented as integer and/or floating point values, and thus the embedding model may be configured to generate embedding vectors based on the integer and/or floating point values. In yet other implementations, a combination of character string, integer, and/or floating point values inputs may be possible, and the embedding model may thus include different sub-models configured to process these different data formats.

The vector comparator may be configured to compare the embedding vector generated from attributes of the unmatched configuration item to each of the candidate embedding vectors and determine corresponding similarity metrics. Specifically, a comparison of this embedding vector with each candidate embedding vector may generate a different similarity metric. In some implementations, the similarity metric may be a Euclidean distance between the embedding vectors being compared. In other implementations, the similarity metric may be a cosine distance between the embedding vectors being compared. Other similarity metrics are possible. Regardless, the similarity metrics may measure respective distances between the embedding vector and each of the candidate embedding vectors in a vector space defined by embedding model. These distances may be indicative of how similar attribute values of the unmatched configuration item are to each set of attribute values from the discovered configuration items.

The vector matcher may be configured to select, based on the similarity metrics, a discovered configuration item that matches the unmatched configuration item. Specifically, the vector matcher may select the configuration items associated with discovered attribute values that most closely match the attribute values of the unmatched configuration item, as measured by way of the similarity metrics. In one example, the vector matcher may be configured to select the discovered configuration item associated with the highest similarity metric. In another example, a discovered configuration item may be additionally or alternatively selected based on its corresponding similarity metric exceeding a threshold similarity value, such as 75%, 80%, 90%, or another desired threshold value (which may also be expressed as a corresponding distance rather than a percentage). Thus, in some cases, selection of the configuration item may be automated.

In a further example, the vector matcher and/or other components of the application may be configured to display some of the similarity metrics by way of a user interface to allow for manual configuration item matching. For example, the n highest similarity metrics may be displayed, where n is an integer value such as 3, 4, 5, 8, etc., and may be modifiable. In some cases, the user interface may also display one or more attribute values of the unmatched configuration item and the attribute values of the discovered configuration items corresponding to the n highest similarity metrics. A user may be able to select one of the discovered configuration items associated with the n highest similarity metrics based on the displayed information, thereby indicating a match for the unmatched configuration item. In some cases, the user may additionally or alternatively indicate that none of the discovered configuration items represent the discovered computing resource, and the unmatched configuration item may remain unmerged.

B. Merging Configuration Items

In general, merging configuration items involves combining attribute values of the unmatched configuration item and the discovered configuration item. During this process, preference is usually given to the attribute values of the discovered configuration item unless these attribute values are empty or default. This is because attribute values of the discovered configuration item are generally considered to be more reliable than those of the unmatched configuration item.

But if the attribute values of the discovered configuration item are empty or default, the corresponding attribute values of the unmatched configuration item may be used in some cases. Empty attribute values may be null values or other forms of non-values. For example, a text-string attribute value that is a zero-length string may be considered to have an empty value. Default attribute values are those assigned by the system (e.g., computational instance 322) by convention or in its freshly-installed (e.g., "out of the box") state. Any attribute value that is not empty and not the default value is considered to have been modified—e.g., written to the CMDB by an application such as the discovery application or manually changed.

Attribute preferences are specified in table 800 of FIG. 8. The leftmost column represents the attribute value of the unmatched configuration item. The center column represents the attribute value of the corresponding discovered configuration item. The rightmost column represents the source of the attribute value that will be chosen when the unmatched configuration item is merged into the discovered configuration item.

For row 802, both sources have the default attribute value. As both sources have the same attribute value, and either can be chosen for the merged configuration item.

For row 804, the unmatched configuration item has the default attribute value and the discovered configuration item has an empty attribute value. Thus, the attribute value of the unmatched configuration item is chosen.

For row 806, the unmatched configuration item has the default attribute value and the discovered configuration item has a modified attribute value. Thus, the attribute value of the discovered configuration item is chosen.

For row 808, the unmatched configuration item has an empty attribute value and the discovered configuration item has the default attribute value. Thus, the attribute value of the discovered configuration item is chosen.

For row 810, both sources have the empty attribute value. As both sources have the same attribute value, and either can be chosen for the merged configuration item.

For row 812, the unmatched configuration item has the empty attribute value and the discovered configuration item has a modified attribute value. Thus, the attribute value of the discovered configuration item is chosen.

For row 814, the unmatched configuration item has a modified attribute value and the discovered configuration item has the default attribute value. Thus, the attribute value of the unmatched configuration item is chosen.

For row 816, the unmatched configuration item has a modified attribute value and the discovered configuration item has the empty attribute value. Thus, the attribute value of the unmatched configuration item is chosen.

For row 818, the unmatched configuration item has a modified attribute value and the discovered configuration item has a modified attribute value. Thus, the attribute value of the discovered configuration item is chosen.

Some embodiments may simplify this selection process by not making a distinction between default and empty attributes. In these embodiments, modified attribute values are given preference over empty/default attribute values, and modified attribute values of the discovered configuration item are given preference over modified attribute values of the unmatched configuration item. If both configuration items have an attribute with empty or default values, either may be selected.

As a concrete example, suppose that an unmatched configuration item is being merged with a discovered configuration item, both representing a server device. Because it was discovered, the discovered configuration item would almost certainly have an attribute value for its IP address, which would be considered to be modified. Then, regardless of whether the corresponding attribute for the unmatched configuration item is empty, has the default value, or has been modified, the IP address of the discovered configuration item would be preserved during the merge procedure. However, if for some reason the discovered configuration item has an empty value for its IP address attribute and the unmatched configuration item has a modified (non-empty, non-default) value for its IP address attribute, then the IP address from the unmatched configuration item will be preserved during the merge procedure.

Merging configuration items may also involve modifying any references to the unmatched configuration item to instead refer to the discovered configuration item. For example, other configuration items in the CMDB and/or tables in the CMDB may include references (e.g., pointers) to the unmatched configuration item. Since the unmatched configuration item might not exist after the merge process, these references should be updated to point to the discovered configuration item. Additional references may exist in other database tables, such as tables used by various remote network management platform applications, and these references may be updated as well.

C. Merging Vulnerabilities of a Configuration Item

As noted above, when two or more configuration items are merged, their associated vulnerabilities are updated to refer to the merged configuration item. But some of these vulnerabilities may be duplicates of one another. For example, any two or more vulnerabilities referring to the same exploit and the same configuration item are effectively duplicates of one another and should also be merged. But merging vulnerabilities can be more complicated than merging configuration items. Thus, a rule-based approach may be used to determine how to merge each field of a vulnerability based on the type of the field and its content.

Generally speaking, vulnerabilities may have three different types of fields: user-defined, system-defined, and application-defined. User-defined fields are fields that were added by the customer of the services provided by the computational instance (e.g., the managed network), and may be identified with field names beginning with the characters "u_". System-defined fields are fields that are defined by the computational instance for all CMDB entries, including vulnerabilities, and may be identified with field names beginning with the characters "sys_". Application-defined fields are those that are defined by the vulnerability scanner or vulnerability response module, and may be identified with field names that do not begin with either the characters "u_" or the characters "sys_". In some embodiments, more or fewer field types may be present, and each may have its own associated set of rules for merging.

The rules for merging user-defined fields are relatively straightforward. Of the two or more vulnerabilities to be merged, the newest, non-empty value is selected.

TABLE 1

| Merge Technique | Description |
| --- | --- |
| Oldest | Among the values of the field for the vulnerabilities to be merged, discard empty, null, and values equal to the default value for the field. From what remains, select the field value that corresponds to the vulnerability with the earliest sys_created_on (see below) timestamp value. |
| Newest | Among the values of the field for the vulnerabilities to be merged, discard empty, null, and values equal to the default value attribute for the field. From what remains, select the field value that corresponds to the vulnerability with the most recent sys_modified_on (see below) timestamp value. |
| Min | Among the values of the field for the vulnerabilities to be merged, discard empty, null, and values equal to the default value for the field. From what remains, select the field value that corresponds to the vulnerability with the smallest field value. |
| Max | Among the values of the field for the vulnerabilities to be merged, discard empty, null, and values equal to the default value for the field. From what remains, select the field value that corresponds to the vulnerability with the largest field value. |
| Concatenate | This technique is typically used with reference fields and text-based fields. For a reference field such as a journal, all of the field's references for the vulnerabilities to be merged are copied to reference the merged vulnerability. For text and other text-like fields like HTML, the values in the field for the vulnerabilities to be merged are appended together in date order, with duplicates removed. |

The rules for merging system-defined fields can be found in Table 1. There are five merging techniques described therein. The "oldest" and "newest" rules operate on timestamps, while the "min" and "max" rules operate on ordered values (e.g., integers, floating point numbers, etc.). The "concatenate" rule operates on references, text, or structured text, and typically combines the values from fields in the vulnerabilities to merge without preferring one vulnerability over the other. This is appropriate where the field is some form of activity log, such as a work notes field or a problem description field in which agents or administrators add free-form text regarding the vulnerability. In these cases, it would be prudent to preserve all of this information in the merged vulnerability. Other types of rules may be defined.

These rules are applied as follows. For the sys_id field (a unique identifier of the vulnerability), the sys_created_on field (a timestamp of when the vulnerability was created), and the sys_created_by field (an indicator of a user or entity that created the vulnerability), the "oldest" rule is applied. For the sys_updated_on field (a timestamp of when the vulnerability was updated) and sys_updated_by field (an indicator of a user or entity that most recently updated the vulnerability), the "newest" rule is applied. For the sys_mod_count field (the number of times the vulnerability was modified), the "max" rule is applied. For any other system-defined field, the "newest" rule is applied. Alternative embodiments may apply the rules to fields in a different fashion.

Various applications may define their own application-specific fields. An example of fields defined by an example vulnerability scanner is shown Table 900 of in FIG. 9. Table 900 has three columns. The leftmost column is the name of the field, the middle column is the merge rule to be used when merging values of this field from different vulnerabilities, and the rightmost column is the type of data containing the field.

Notably, Table 900 includes merge rules that include and go beyond those described above. For example, the "active" field value may be subject to a custom computation when merged, the "age_closed" field value may be calculated based on a difference between the "closed_at" and "age_closed" field values, and so on. A further merge rule is based on choice list order, where the possible values of a field are static and defined in a list. The field value can only be one of the values from the choice list, or null. The values in the choice list may be ordered, but may differ from the assigned order in the choice list. Therefore minimum or maximum calculations in choice list order means the value that corresponds to the minimum or maximum order position in the choice list and not necessarily the minimum or maximum value in the list. Further, the types of data may include tinyint (a 1-byte integer), int (a 4-byte integer), datetime (a data structure representing a date and time, usually as two 4-byte integers), varchar(n) (an n-byte string), and medium-text (a string with a maximum length of 16,777,215 characters).

As example, values of the "work_notes" fields are concatenated in the merged vulnerability, whereas the value of the "assigned_to" field in the merged vulnerability is the newest among the vulnerabilities that are being merged. If fields not in this list are present in the vulnerabilities, the newest value is selected.

In some cases, the merged value of one field may rely upon the merged value of another field. Thus, certain vulnerability fields may be merged in a specific order due to these dependencies. An example may be the "state" and "substate" fields (not shown in FIG. 9).

The "state" field represents the state of the vulnerability, which may have values such as open, under investigation, awaiting implementation, resolved, deferred, and closed. The "substate" field may only have a non-empty value when the "state" value is closed. Therefore, values of the "state" fields in the vulnerable items should be merged before the values of the "substate" fields are merged.

Merging of the "state" fields occurs according to Table 1000 of FIG. 10. Table 1000 considers how the state field values of two vulnerabilities, vulnerability 1 and vulnerability 2, are merged. The leftmost column represents the value of the "state" field of vulnerability 1 and the second leftmost column represents the value of the "state" field of vulnerability 2. The second rightmost column represents a merged value of the "state" field or another field of vulnerability 1 that will be used to determine the merged state. The rightmost column represents a merged value of the "state" field or a field of vulnerability 2 that will be used to determine the merged state. When a merged value of the "state" field is present for a combination of "state" field values of vulnerability 1 and vulnerability 2, it is the same in both the second rightmost and rightmost columns.

The merge process proceeds as follows. The "state" field values of vulnerability 1 and vulnerability 2 are considered. If the second rightmost and rightmost columns indicate a merged value, then that value will be used in the "state" field of the merged vulnerability. For example, as shown in Table 1000, when vulnerability 1 is in any of the under investigation, awaiting implementation or in review states, that state will be used as the merged "state" value when vulnerability 2 is in the open state.

If the second rightmost and rightmost columns indicate fields of their respective vulnerabilities, then the values of these two fields are compared and the greater of the values determines which "state" field value is used in the merged vulnerability. For example, when the "state" field value of vulnerability 1 is resolved and the "state" field value of vulnerability 2 is open, the value of the resolution_date field of vulnerability 1 is compared to the value of the opened_at field of vulnerability 2. If the resolution_date field has the greater value, the "state" field value of the merged vulnerability will be resolved. If the opened_at field has the greater value, the "state" field value of the merged vulnerability will be open.

Further, value of the "substate" field in the merged vulnerability is set to empty unless the value of the "state" field in the merged vulnerability is closed. In the latter case, the value of the "substate" field is that of the vulnerability from which the closed state originated.

IX. Example Operations

Figure 11:
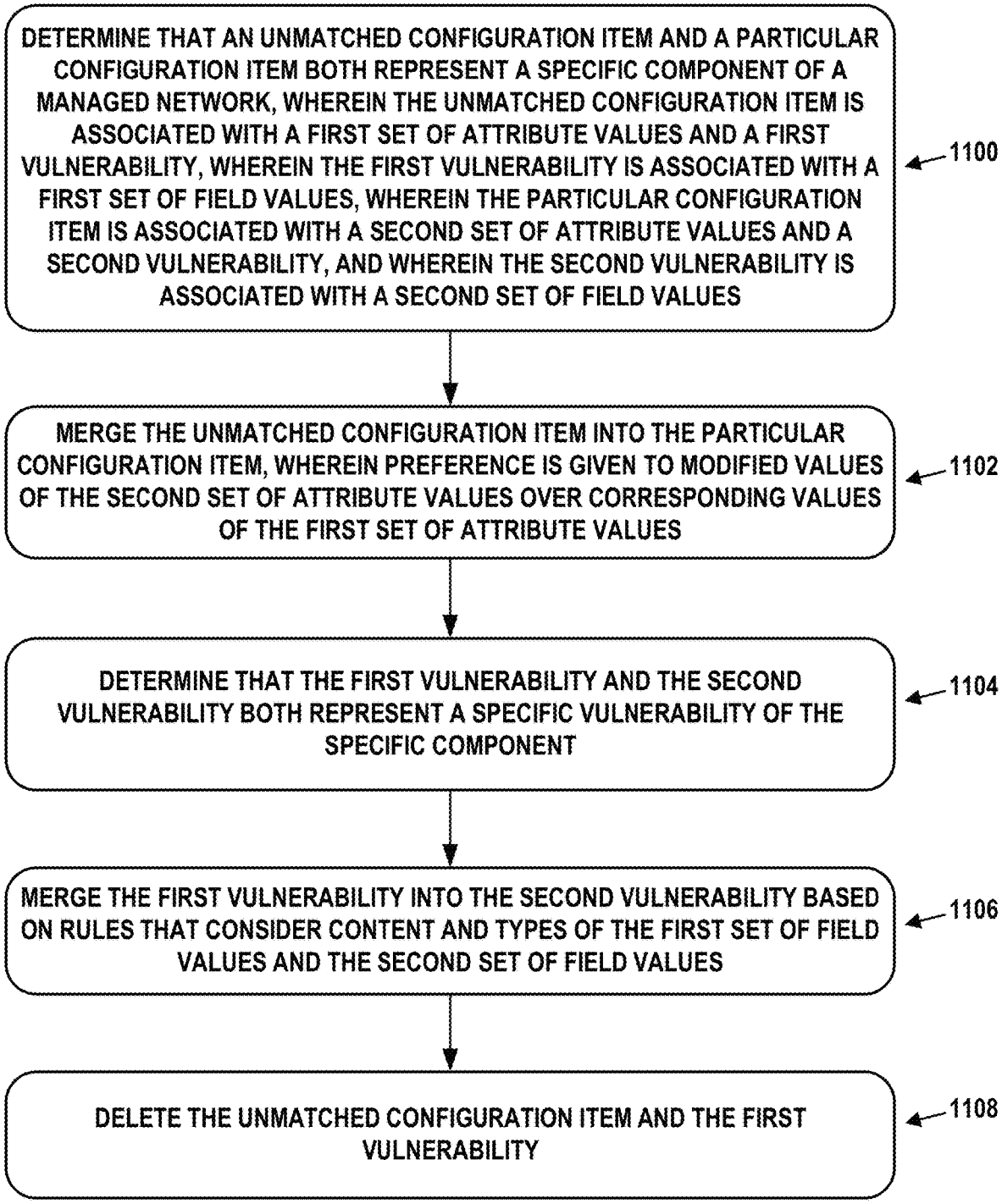
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 11 may be simplified by the removal of any one or more of the features shown therein. Further, these embodiments may be combined with features, aspects, and/or implementations of any of the previous figures or otherwise described herein.

Block 1100 may involve determining that an unmatched configuration item and a particular configuration item both represent a specific component of a managed network, wherein the unmatched configuration item is associated with a first set of attribute values and a first vulnerability, wherein the first vulnerability is associated with a first set of field values, wherein the particular configuration item is associated with a second set of attribute values and a second vulnerability, and wherein the second vulnerability is associated with a second set of field values.

Block 1102 may involve merging the unmatched configuration item into the particular configuration item, wherein preference is given to modified values of the second set of attribute values over corresponding values of the first set of attribute values.

Block 1104 may involve determining that the first vulnerability and the second vulnerability both represent a specific vulnerability of the specific component. For example, each instance of a vulnerability of the unmatched configuration item and the particular configuration item may have a reference field to a unique vulnerability data database (e.g., governmental or private). All vulnerabilities in such a database are cataloged as entries with unique identifiers and other related information in a separate table. When both instances of vulnerabilities of the configuration items reference the same entry record in the database, then each instance is the same vulnerability.

Block 1106 may involve merging the first vulnerability into the second vulnerability based on rules that consider content and types of the first set of field values and the second set of field values.

Block 1108 may involve deleting the unmatched configuration item and the first vulnerability.

In some embodiments, merging the unmatched configuration item into the particular configuration item comprises updating references that point to the unmatched configuration item so that they point to the particular configuration item.

In some embodiments, the modified values of the second set of attribute values are non-empty and non-default values.

In some embodiments, giving preference to the modified values of the second set of attribute values over corresponding values of the first set of attribute values comprises: (i) giving preference to the modified values of the second set of attribute values over corresponding values of the first set of attribute values that are modified, default, or empty, and (ii) giving preference to default values of the second set of attribute values over corresponding values of the first set of attribute values that are empty.

In some embodiments, preference is also given to modified values of the first set of attribute values over corresponding values of the second set of attribute values that are default or empty.

Some embodiments may involve: (i) determining that a further unmatched configuration item and the particular configuration item both represent the specific component, wherein the further unmatched configuration item is associated with a further set of attribute values and a further vulnerability, and wherein the further vulnerability is associated with a further set of field values; (ii) merging the further unmatched configuration item into the particular configuration item, wherein preference is given to the modified values of the second set of attribute values over corresponding values of the further set of attribute values; (iii) determining that the further vulnerability and the second vulnerability both represent the specific vulnerability; (iv) merging the further vulnerability into the second vulnerability based on the rules; and (v) deleting the further unmatched configuration item and the further vulnerability.

In some embodiments, the types are either user-defined, system-defined, or application-defined, wherein user-defined fields are defined by an entity associated with the managed network, wherein system-defined fields are defined by an entity associated with the system, and wherein application-defined fields are defined by an entity associated with an application that identified the unmatched configuration item. Merging a user-defined field may involve giving preference to a newest, non-empty value of the user-defined field from among corresponding field values of the first vulnerability and the second vulnerability. Merging a system-defined field or an application-defined field may involve either: (i) giving preference to an oldest, newest, lowest or highest value of the system-defined field or the application-defined field from among corresponding field values of the first vulnerability and the second vulnerability, or (ii) concatenating the corresponding field values of the first vulnerability and the second vulnerability.

In some embodiments, merging a specific field of the first vulnerability into the second vulnerability comprises either: (i) giving preference to an oldest, newest, lowest or highest value of the specific field from among corresponding field values of the first vulnerability and the second vulnerability, or (ii) concatenating the corresponding field values of the first vulnerability and the second vulnerability.

In some embodiments, the rules require that a first field in the first vulnerability and the second vulnerability is merged before a second field in the first vulnerability and the second vulnerability is merged.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
  persistent storage containing a plurality of configuration items and an unmatched configuration item, wherein the unmatched configuration item is associated with a first set of attribute values and a first vulnerability, and wherein the first vulnerability is associated with a first set of field values; and
  one or more processors configured to:
    determine that the unmatched configuration item and a particular configuration item from the plurality of configuration items both represent a specific component of a managed network, wherein the particular configuration item is associated with a second set of attribute values and a second vulnerability, and wherein the second vulnerability is associated with a second set of field values;
    merge the unmatched configuration item into the particular configuration item, wherein preference is given to modified values of the second set of attribute values over corresponding values of the first set of attribute values;
    determine that the first vulnerability and the second vulnerability both represent a specific vulnerability of the specific component;
    merge the first vulnerability into the second vulnerability based on rules that consider content and types of the first set of field values and the second set of field values; and
    delete the unmatched configuration item and the first vulnerability from the persistent storage.

2. The system of claim 1, wherein merging the unmatched configuration item into the particular configuration item comprises updating references in the persistent storage that point to the unmatched configuration item so that they point to the particular configuration item.

3. The system of claim 1, wherein the modified values of the second set of attribute values are non-empty and non-default values.

4. The system of claim 1, wherein giving preference to the modified values of the second set of attribute values over corresponding values of the first set of attribute values comprises: (i) giving preference to the modified values of the second set of attribute values over corresponding values of the first set of attribute values that are modified, default, or empty, and (ii) giving preference to default values of the second set of attribute values over corresponding values of the first set of attribute values that are empty.

5. The system of claim 1, wherein preference is also given to modified values of the first set of attribute values over corresponding values of the second set of attribute values that are default or empty.

6. The system of claim 1, wherein the one or more processors are further configured to:
determine that a further unmatched configuration item in the persistent storage and the particular configuration item both represent the specific component, wherein the further unmatched configuration item is associated with a further set of attribute values and a further vulnerability, and wherein the further vulnerability is associated with a further set of field values;
merge the further unmatched configuration item into the particular configuration item, wherein preference is given to the modified values of the second set of attribute values over corresponding values of the further set of attribute values;
determine that the further vulnerability and the second vulnerability both represent the specific vulnerability;
merge the further vulnerability into the second vulnerability based on the rules; and
delete the further unmatched configuration item and the further vulnerability from the persistent storage.

7. The system of claim 1, wherein the types are either user-defined, system-defined, or application-defined, wherein user-defined fields are defined by an entity associated with the managed network, wherein system-defined fields are defined by an entity associated with the system, and wherein application-defined fields are defined by an entity associated with an application that identified the unmatched configuration item.

8. The system of claim 7, wherein merging a user-defined field comprises giving preference to a newest, non-empty value of the user-defined field from among corresponding field values of the first vulnerability and the second vulnerability.

9. The system of claim 7, wherein merging a system-defined field or an application-defined field comprises either: (i) giving preference to an oldest, newest, lowest or highest value of the system-defined field or the application-defined field from among corresponding field values of the first vulnerability and the second vulnerability, or (ii) concatenating the corresponding field values of the first vulnerability and the second vulnerability.

10. The system of claim 1, wherein merging a specific field of the first vulnerability into the second vulnerability comprises either: (i) giving preference to an oldest, newest, lowest or highest value of the specific field from among corresponding field values of the first vulnerability and the second vulnerability, or (ii) concatenating the corresponding field values of the first vulnerability and the second vulnerability.

11. The system of claim 1, wherein the rules require that a first field in the first vulnerability and the second vulnerability is merged before a second field in the first vulnerability and the second vulnerability is merged.

12. A computer-implemented method comprising:
determining that an unmatched configuration item and a particular configuration item both represent a specific component of a managed network, wherein the unmatched configuration item is associated with a first set of attribute values and a first vulnerability, wherein the first vulnerability is associated with a first set of field values, wherein the particular configuration item is associated with a second set of attribute values and a second vulnerability, and wherein the second vulnerability is associated with a second set of field values;
merging the unmatched configuration item into the particular configuration item, wherein preference is given to modified values of the second set of attribute values over corresponding values of the first set of attribute values;
determining that the first vulnerability and the second vulnerability both represent a specific vulnerability of the specific component;
merging the first vulnerability into the second vulnerability based on rules that consider content and types of the first set of field values and the second set of field values; and
deleting the unmatched configuration item and the first vulnerability.

13. The computer-implemented method of claim 12, wherein merging the unmatched configuration item into the particular configuration item comprises updating references that point to the unmatched configuration item so that they point to the particular configuration item.

14. The computer-implemented method of claim 12, wherein giving preference to the modified values of the second set of attribute values over corresponding values of the first set of attribute values comprises: (i) giving preference to the modified values of the second set of attribute values over corresponding values of the first set of attribute values that are modified, default, or empty, and (ii) giving preference to default values of the second set of attribute values over corresponding values of the first set of attribute values that are empty.

15. The computer-implemented method of claim 12, wherein the one or more processors are further configured to:
determining that a further unmatched configuration item and the particular configuration item both represent the specific component, wherein the further unmatched configuration item is associated with a further set of attribute values and a further vulnerability, and wherein the further vulnerability is associated with a further set of field values;
merging the further unmatched configuration item into the particular configuration item, wherein preference is given to the modified values of the second set of attribute values over corresponding values of the further set of attribute values;
determining that the further vulnerability and the second vulnerability both represent the specific vulnerability;
merging the further vulnerability into the second vulnerability based on the rules; and deleting the further unmatched configuration item and the further vulnerability.

16. The computer-implemented method of claim 12, wherein the types are either user-defined, system-defined, or application-defined, wherein user-defined fields are defined by an entity associated with the managed network, wherein system-defined fields are defined by an entity associated with the system, and wherein application-defined fields are defined by an entity associated with an application that identified the unmatched configuration item.

17. The computer-implemented method of claim 16, wherein merging a user-defined field comprises giving preference to a newest, non-empty value of the user-defined field from among corresponding field values of the first vulnerability and the second vulnerability.

18. The computer-implemented method of claim 12, wherein merging a specific field of the first vulnerability into the second vulnerability comprises either: (i) giving preference to an oldest, newest, lowest or highest value of the specific field from among corresponding field values of the first vulnerability and the second vulnerability, or (ii) concatenating the corresponding field values of the first vulnerability and the second vulnerability.

19. The computer-implemented method of claim 12, wherein the rules require that a first field in the first vulnerability and the second vulnerability is merged before a second field in the first vulnerability and the second vulnerability is merged.

20. An article of manufacture including a non-transitory computer-readable medium, having stored thereon program instructions that, upon execution by a computing system, cause the computing system to perform operations comprising:

determining that an unmatched configuration item and a particular configuration item both represent a specific component of a managed network, wherein the unmatched configuration item is associated with a first set of attribute values and a first vulnerability, wherein the first vulnerability is associated with a first set of field values, wherein the particular configuration item is associated with a second set of attribute values and a second vulnerability, and wherein the second vulnerability is associated with a second set of field values;

merging the unmatched configuration item into the particular configuration item, wherein preference is given to modified values of the second set of attribute values over corresponding values of the first set of attribute values;

determining that the first vulnerability and the second vulnerability both represent a specific vulnerability of the specific component;

merging the first vulnerability into the second vulnerability based on rules that consider content and types of the first set of field values and the second set of field values; and deleting the unmatched configuration item and the first vulnerability.

\* \* \* \* \*